US011436779B2

(12) United States Patent
Chen (10) Patent No.: US 11,436,779 B2
(45) Date of Patent: Sep. 6, 2022

(54) IMAGE PROCESSING METHOD, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Yu Chen, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/897,341

(22) Filed: Jun. 10, 2020

(65) Prior Publication Data

US 2020/0302670 A1    Sep. 24, 2020

Related U.S. Application Data

(63) Continuation of application No. PCT/CN2019/073995, filed on Jan. 30, 2019.

(30) Foreign Application Priority Data

Feb. 12, 2018   (CN) .......................... 201810147314.2

(51) Int. Cl.
*G06T 15/00* (2011.01)
*G06T 13/40* (2011.01)
(Continued)

(52) U.S. Cl.
CPC .............. *G06T 13/40* (2013.01); *G06T 15/04* (2013.01); *G06V 40/165* (2022.01); *G06V 40/171* (2022.01); *G06V 40/176* (2022.01)

(58) Field of Classification Search
CPC ........... G06K 9/00315; G06K 9/00248; G06K 9/00281; G06T 13/40; G06T 15/04
(Continued)

(56) References Cited

U.S. PATENT DOCUMENTS 8,219,438 B1 *   7/2012   Moon ................ G06Q 30/0201
                                                      705/7.29
9,679,412 B2 *   6/2017   Park ...................... G06T 17/205
(Continued)

FOREIGN PATENT DOCUMENTS

CN         106599817 A      4/2017
CN         106709975 A      5/2017
(Continued)

OTHER PUBLICATIONS

Jackson AS, Bulat A, Argyriou V, Tzimiropoulos G. Large pose 3D face reconstruction from a single image via direct volumetric CNN regression. InProceedings of the IEEE International Conference on Computer Vision 2017 (pp. 1031-1039).*

(Continued)

*Primary Examiner* — Phu K Nguyen
(74) *Attorney, Agent, or Firm* — Sughrue Mion, PLLC (57) ABSTRACT

An image processing method, an electronic device, and a storage medium for processing an image dynamically. The image processing method includes obtaining a three-dimensional image of a first facial image based on a plurality of first feature points of the first facial image, the plurality of first feature points being used to identify a first face in the first facial image; obtaining a plurality of second feature points in each of a plurality of frames of second facial images in real time, the plurality of second feature points being used to identify an expression change of a second face; and synchronizing the three-dimensional image of the first facial image based on changes of the plurality of second feature points in each of the plurality of frames of second facial images, to simulate the expression change of the second face.

20 Claims, 5 Drawing Sheets

(51) Int. Cl.
*G06T 15/04* (2011.01)
*G06V 40/16* (2022.01)

(58) Field of Classification Search
USPC .......................................... 345/418
See application file for complete search history.

(56) References Cited

U.S. PATENT DOCUMENTS

| | | | | |
|---|---|---|---|---|
| 10,089,522 | B2* | 10/2018 | Yu | G06K 9/00255 |
| 10,332,312 | B2* | 6/2019 | Zatepyakin | G06T 7/73 |
| 10,572,720 | B2* | 2/2020 | Hu | G06K 9/00315 |
| 11,049,310 | B2* | 6/2021 | Krokhalev | G06T 13/40 |
| 11,113,859 | B1* | 9/2021 | Xiao | G06T 17/205 |
| 2007/0189584 | A1* | 8/2007 | Li | G06K 9/00295 |
| | | | | 382/118 |
| 2015/0235372 | A1 | 8/2015 | Smolyanskiy et al. | |
| 2016/0275721 | A1* | 9/2016 | Park | G06K 9/00248 |
| 2017/0091535 | A1* | 3/2017 | Yu | G06K 9/00248 |
| 2018/0182165 | A1* | 6/2018 | Zatepyakin | G06K 9/00228 |
| 2018/0365484 | A1* | 12/2018 | Yu | G06K 9/00255 |
| 2020/0234482 | A1* | 7/2020 | Krokhalev | G06K 9/00261 |
| 2020/0234690 | A1* | 7/2020 | Savchenkov | G10L 13/00 |
| 2020/0302670 | A1* | 9/2020 | Chen | G06K 9/00315 |

FOREIGN PATENT DOCUMENTS

| | | | |
|---|---|---|---|
| CN | 106778628 A | 5/2017 | |
| CN | 106920274 A | 7/2017 | |
| CN | 108256505 A | 7/2018 | |

OTHER PUBLICATIONS

Yin L, Wei X, Sun Y, Wang J, Rosato MJ. A 3D facial expression database for facial behavior research. In7th international conference on automatic face and gesture recognition (FGR06) Apr. 10, 2006 (pp. 211-216). IEEE.*

Gu G, Kim ST, Kim K, Baddar WJ, Ro YM. Differential generative adversarial networks: Synthesizing non-linear facial variations with limited number of training data. arXiv preprint arXiv:1711.10267. Nov. 28, 2017.*

Neurotechnology, SentiMask SDK Technology Demo, Dec. 20, 2017, https://www.youtube.com/watch?v=z_zRa6S9oV0.*

Photoshop Training Channel (PTC); How to Adjust and Change Facial Features in Photoshop; Sep. 3, 2016; https://www.youtube.com/watch?v=ujz2q0dTaM4.*

Written Opinion of the International Searching Authority for PCT/CN2019/073995 dated May 6, 2019 (PCT/ISA 237).

Communication dated Apr. 28, 2021 from the State Intellectual Property Office of P.R. of China in Application No. 201810147314.2.

Zhong Qianli, "Research and Implementation of Automatic Face Replacement in Images", Information Technology Series of Full-Text Databases of Excellent Masterchar(39)s Degree Thesis of China, Feb. 2017, pp. 4, 13, 50.

International Search Report for PCT/CN2019/073995 dated May 6, 2019 (PCT/ISA/210).

* cited by examiner

IMAGE PROCESSING METHOD, ELECTRONIC DEVICE, AND STORAGE MEDIUM

CROSS-REFERENCE TO RELATED APPLICATION(S)

This application is a continuation of PCT/CN2019/073995 and claims priority to Chinese Patent Application No. 201810147314.2, entitled "IMAGE PROCESSING METHOD, ELECTRONIC DEVICE, AND STORAGE MEDIUM" and filed with the Chinese Patent Office on Feb. 12, 2018, both of which are incorporated by reference herein in their entirety.

BACKGROUND

1. Field

Embodiments of the disclosure relate to the field of image processing, and more particularly, to an image processing method, an electronic device, and a storage medium for causing a static image to dynamically change.

2. Description of Related Art

With the development of image processing technologies, the image processing relating to photo-shopping an image and applying a filter to change a color or tone of an image has gained wide popularity and advanced significantly. However, in a related art, the image processing techniques only involve processing a static image, that is, causing a stationary image to statically change. In other words, the image processing techniques of the related art is not capable of causing a static image to dynamically change. Therefore, embodiments of the present disclosure solves the above discussed problems by providing an image processing method capable of causing a static image to dynamically change.

SUMMARY

According to an embodiment, there is provided an image processing method, performed by an electronic device, the method including: obtaining a three-dimensional image of a first facial image based on a plurality of first feature points of the first facial image, the plurality of first feature points being used to identify a first face in the first facial image; obtaining a plurality of second feature points in each of a plurality of frames of second facial images in real time, the plurality of second feature points being used to identify an expression change of a second face; and synchronizing the three-dimensional image of the first facial image based on changes of the plurality of second feature points in each of the plurality of frames of second facial images, to simulate the expression change of the second face.

According to an embodiment, there is provided an electronic device including: at least one memory configured to store computer program code and at least one processor configured to access the computer program code and operate as instructed by the computer program code. The computer program code including: three-dimensional image obtaining code configured to cause the at least one processor to obtain a three-dimensional image of a first facial image based on a plurality of first feature points of the first facial image, the plurality of first feature points being used to identify a first face in the first facial image; feature point obtaining code configured to cause the at least one processor to obtain a plurality of second feature points in each of a plurality of frames of second facial images in real time, the plurality of second feature points being used to identify an expression change of a second face; and synchronization code configured to cause the at least one processor to synchronize the three-dimensional image of the first facial image based on changes of the plurality of second feature points in each of the plurality of frames of second facial images, to simulate the expression change of the second face.

According to an embodiment, there is provided a non-transitory computer-readable storage medium, storing one or more programs including at least one instruction, when the at least one instruction is loaded and executed by a processor, causes the processor to: obtain a three-dimensional image of a first facial image based on a plurality of first feature points of the first facial image, the plurality of first feature points being used to identify a first face in the first facial image; obtaining a plurality of second feature points in each of a plurality of frames of second facial images in real time, the plurality of second feature points being used to identify an expression change of a second face; and synchronizing the three-dimensional image of the first facial image based on changes of the plurality of second feature points in each of the plurality of frames of second facial images, to simulate the expression change of the second face.

BRIEF DESCRIPTION OF THE DRAWINGS

To describe the technical solutions of the embodiments of the disclosure more clearly, the following description briefly introduces the accompanying drawings for describing the embodiments. Apparently, the accompanying drawings in the following description show only some of the embodiments of the disclosure, and a person of ordinary skill in the art may derive other embodiments from these accompanying drawings and the descriptions thereof without creative efforts.

DESCRIPTION

To make the objectives, technical solutions, and advantages of certain embodiments of the disclosure clearer, the following description describes the embodiments in detail with reference to the accompanying drawings.

Figure 1:
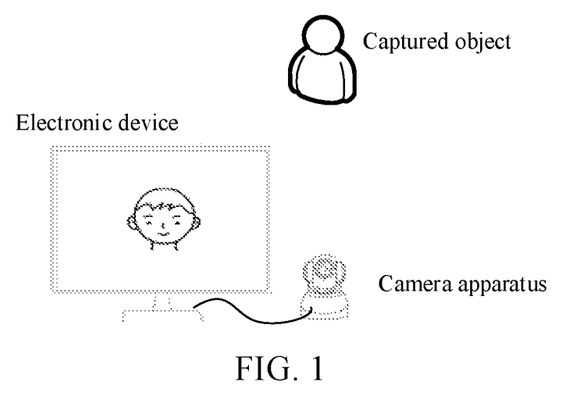
FIG. 1 is a schematic diagram of an implementation environment according to an embodiment.

FIG. 1 is a schematic diagram of an implementation environment according to an embodiment. Referring to FIG. 1, the implementation environment may include an electronic device and a camera apparatus. The camera apparatus may be a camera apparatus mounted on the electronic device, or may be a camera apparatus connected to the electronic device. The connection may be wired connection or wireless connection, however, it is not limited thereto. A first facial image involved in this embodiment may be any image including a face, and a user of the electronic device may select any image including a face to be processed. For example, the first facial image may be a human facial image, or a facial image of an animal. A second facial image may be a facial image collected in real time by the camera apparatus. The real-time collection may include capturing a face of an object, which may be used as a synchronization target, to identify an expression change of the face by identifying feature points and extracting the identified feature points.

Figure 2:
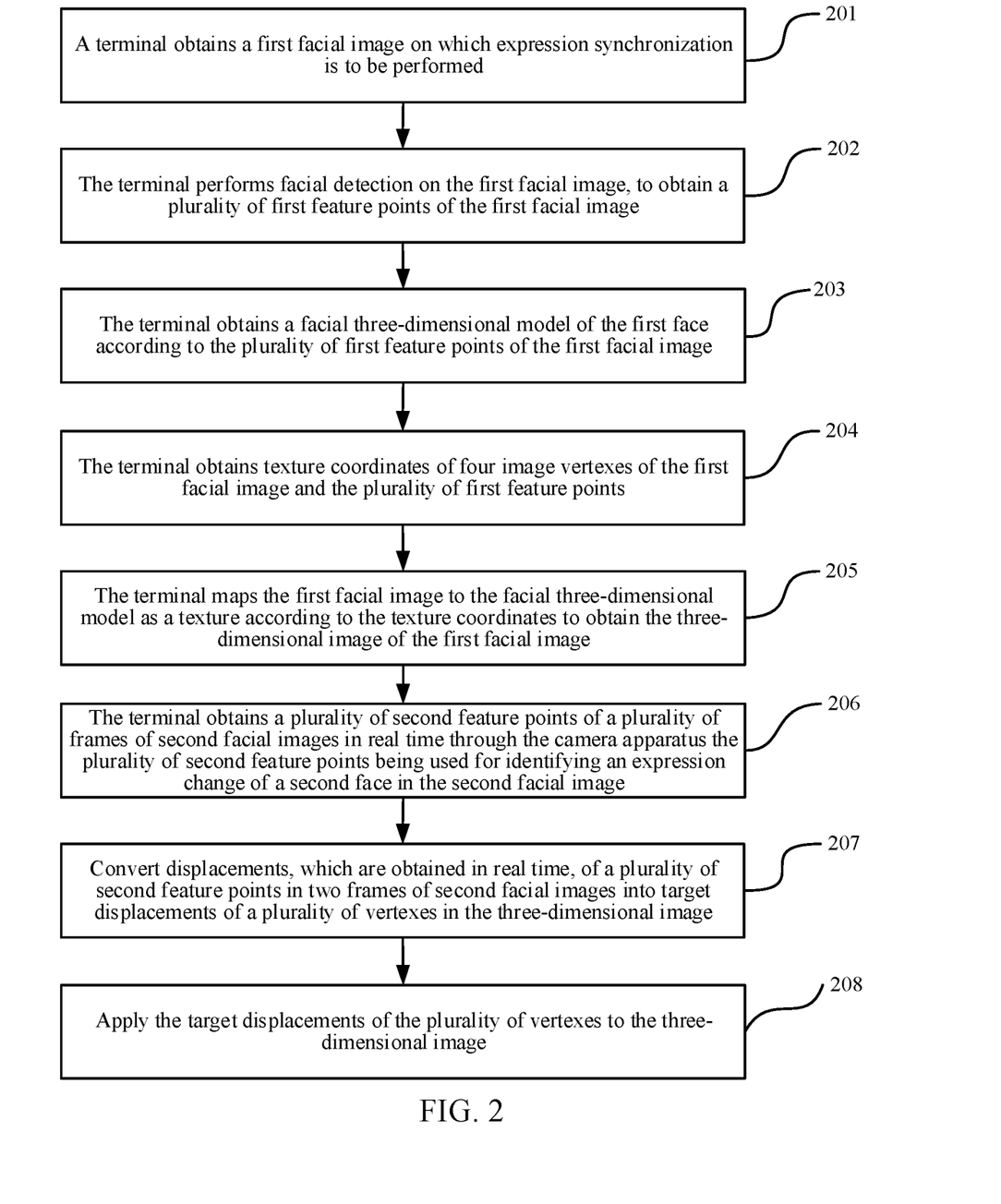
FIG. 2 is a flowchart of an image processing method according to an embodiment.

FIG. 2 is a flowchart of an image processing method according to an embodiment. The image processing method may be applied to an electronic device, and the electronic device may be provided as a terminal device, such as a mobile phone, a camera, a laptop, etc.

The image processing method may include obtaining, by a terminal, a first facial image on which expression synchronization is to be performed (S201).

Here, the first facial image may be, for example, a facial image of a person, an animal, an animated object, or an image with some facial expression to which a synchronization may be performed. A user may select any image stored in the terminal as the first facial image. As described above, the first facial image may be a facial image of a person or an animal. Because most animals have five sense organs, expression synchronization across species may also be performed, to achieve a better display effect. However, the embodiment is not limited thereto.

The terminal may perform facial detection on the first facial image, to obtain a plurality of first feature points of the first facial image, the plurality of first feature points being used for identifying a first face in the first facial image.

Figure 3:
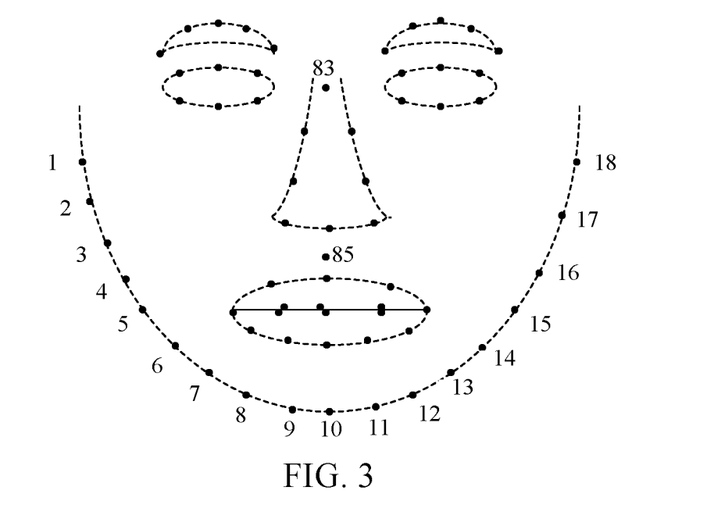
FIG. 3 is a schematic diagram of a feature point identification manner according to an embodiment.

During the facial detection, a plurality of feature points used for representing facial features may be detected. For example, given that the facial detection is human facial detection, as shown in FIG. 3, a feature point obtained by performing the facial detection on the first facial image may be used as a first feature point, and a feature point obtained through real-time collection in the following steps may be used as a second feature point for distinction. However, the feature point identification manner shown in FIG. 3 is only an example. Another identification manner may be used in the facial detection, and when a different facial detection method is used, a quantity of obtained feature points may be different.

In step 203, the terminal may obtain a facial three-dimensional model of the first facial image according to the plurality of first feature points of the first facial image.

When obtaining the facial three-dimensional model based on the plurality of first feature points, the terminal may first obtain a universal facial three-dimensional model, and adjust the universal facial three-dimensional model based on the plurality of first feature points, so that sizes, spacing, locations, and the like of facial organs on the universal facial three-dimensional model may comply with sizes, spacing, and locations of facial organs of the first face in the first facial image. A facial three-dimensional model obtained through the foregoing adjustment may actually simulate the first facial image. In addition, using an example that the face is a human face, the universal facial three-dimensional model may be a universal human facial model such as a CANDIDE-3 model.

In this embodiment, the adjustment may include two aspects, an overall adjustment and a local adjustment. The overall adjustment performs scaling processing or the like on the universal facial three-dimensional model so that a size and a direction of a projection of the universal facial three-dimensional model is the same as those of the face in the facial image, which is on a two-dimensional plane. The local adjustment adjusts corresponding vertexes in the facial model according to the plurality of first feature points, so that the vertexes match locations of the detected feature points in the facial image. If the size and the direction of the face in the first facial image are the same as the size and the direction of the face in the universal facial three-dimensional model, only the local adjustment may be performed. However, the embodiment is not limited thereto.

For example, when applying the overall adjustment and the local adjustment, a manner of projecting the universal facial three-dimensional model to a two-dimensional plane and adjusting the projected points based on the plurality of second feature points may be used. Each feature point of the plurality of first feature points has a feature point number, and each vertex in the universal facial three-dimensional model also has a number. The feature point numbers are in a one-to-one correspondence with the vertex numbers. Therefore, the universal facial three-dimensional model may be projected onto a two-dimensional plane, to obtain projection points of the plurality of vertexes. The plurality of vertexes may include a plurality of vertexes used for identifying a facial contour, and projection points of the plurality of vertexes used for identifying the facial contour may determine a facial area. A size and a direction of the facial area may be adjusted based on the first feature points, which are used for identifying the facial contour, so that a plurality of adjusted projection points are obtained based on the adjustment on the facial area. For example, the adjustment may include a proportion adjustment, a width and length adjustment, and the like. During the local adjustment, locations of the adjusted projection points may further be adjusted to overlap the plurality of first feature points, and depth information of corresponding vertexes may be applied to the adjusted projection points, to obtain an adjusted facial three-dimensional model. The foregoing adjustment procedure is only an example, and a manner of adjustment is not limited in this embodiment.

In step 204, the terminal may obtain texture coordinates of four image vertexes of the first facial image and the plurality of first feature points.

Aside from the facial area, the first facial image may further include a background area. To enable a three-dimensional image after modeling to reflect a form of the face and retain an entire display effect of the image, texture coordinates of vertexes of the image need to be determined to ensure integrity of the constructed three-dimensional image.

A specific procedure of obtaining the texture coordinates may include converting coordinates of key points and the image vertexes into a coordinate system of image textures. A conversion algorithm may be as follows: a texture x-axis coordinate=(an x-axis coordinate+an image width/2)/the image width, and a texture y-axis coordinate=(a y-axis coordinate+the image width/2)/the image width. In the procedure of obtaining the texture coordinates, any coordinate conversion manner may be used, which is not limited in this embodiment.

In step 205, the terminal may map the first facial image to the facial three-dimensional model as a texture according to the texture coordinates, to obtain the three-dimensional image of the first facial image.

Through the texture mapping procedure, a real visual effect may be achieved without changing geometrical information of the facial three-dimensional model. The texture mapping may be color texture mapping.

Figure 4:
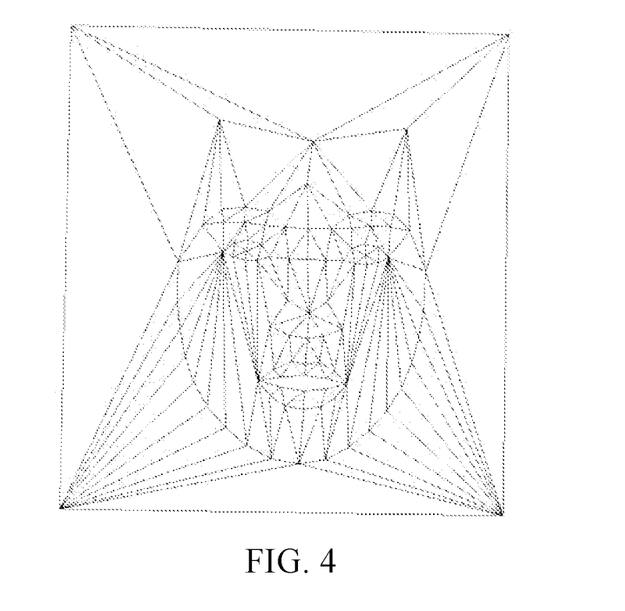
FIG. 4 is an effect diagram of a three-dimensional model of a facial image before texture mapping according to an embodiment.

FIG. 4 is an effect diagram of a three-dimensional model of a face before texture mapping according to an embodiment. A real three-dimensional image of the first face may be obtained by using the first facial image as a texture and mapping the first facial image to a plane of the constructed facial three-dimensional model according to the texture coordinates of the image vertexes and the first feature points.

The foregoing step 204 and step 205 are procedures of mapping the first facial image to the facial three-dimensional model as a texture according to the texture coordinates of the first facial image to obtain the three-dimensional image of the first facial image. In the texture mapping procedure, a manner of mapping feature points of a two-dimensional texture image to coordinates of the three-dimensional model may be used. However, the embodiment is not limited thereto.

The foregoing step 201 to step 205 are an example of a procedure for obtaining the three-dimensional image of the first facial image based on a two-dimensional first facial image. In the procedure of obtaining a three-dimensional image based on a two-dimensional image, however, another manner may also be used.

In step 206, the terminal may obtain a plurality of second feature points of a plurality of frames of second facial images in real time through the camera apparatus, the plurality of second feature points being used for identifying an expression change of a second face.

In this embodiment, the user may select a target to be synchronized. For example, the target may be a face in a real scenario or a face in a video. Therefore, the user may directly capture the second face in the second facial image through the camera apparatus to obtain a plurality of frames of second facial images in real time in a capturing procedure. Facial expressions and/or actions in the plurality of frames of second facial images may change with capturing time. The terminal may perform the facial detection on the plurality of frames of second facial images obtained in real time to obtain the plurality of second feature points.

When the second facial image is obtained in real time through the camera apparatus, if it is detected that an offset between a facial orientation direction of the second facial image and a direction facing the camera apparatus is greater than or equal to a predetermined threshold, the following synchronization procedure may not be performed, to prevent relatively large distortion from occurring in the synchronization, and ensure that an expression change obtained through the synchronization can simulate an expression change of the target in real time.

Accordingly, if it is detected that the offset is greater than or equal to the predetermined threshold, the terminal may generate, according to an offset situation of the target, prompt information corresponding to the offset situation. The prompt information may be used for prompting the target to adjust a posture, so that the synchronization may be subsequently performed. For example, when the offset situation of the target is offsetting to the left by 20 degrees, prompt information may be generated according to the offset situation, and the prompt information may be "rotating to the right by 20 degrees".

In step 207, the terminal may convert displacements, which are obtained in real time, of a plurality of second feature points in two frames of second facial images into target displacements of a plurality of vertexes in the three-dimensional image, the plurality of vertexes in the three-dimensional image being in a one-to-one correspondence with the plurality of first feature points of the first facial image.

According to an embodiment, the conversion procedure may include using a distance between two target first feature points in the plurality of first feature points as a first unit distance; using a distance between two second feature points, which correspond to the two target first feature points, in one frame of second facial image as a second unit distance; obtaining a ratio of the second unit distance to the first unit distance; and dividing a displacement of each second feature point in the plurality of second feature points in the two frames of second facial images by the ratio, to obtain a target displacement of each vertex in the three-dimensional image.

In this embodiment, because the three-dimensional image is obtained based on the first facial image, a distance between the feature points in the three-dimensional image may be reflected based on a distance between the feature points in the first facial image. Therefore, a ratio of a distance between two feature points in the second facial image to a distance between two corresponding feature points in the first facial image may be used as a basis of performing displacement conversion between the three-dimensional image and the second facial image, where both the second facial image and the first facial image are two-dimensional images.

When the terminal synchronizes the expression change of the target to the three-dimensional image, each time one frame of second facial image is obtained, the terminal may use a displacement between a second feature point of a currently obtained second facial image and a second feature point of a previous frame of second facial image to perform synchronization. The terminal may further perform synchronization at an interval of a target quantity of frames of second facial images and according to a displacement between a second feature point of a first frame of the target quantity of frames of second facial images and a second feature point of a last frame of the target quantity of frames of second facial image. However, the embodiment is not limited thereto, and may perform synchronization according to various methods.

The displacements of the plurality of second feature points may be relative displacements, that is, a displacement of a latter frame may be marked with reference to a location of the plurality of feature points in a previous frame. The displacements of the plurality of second feature points may be absolute displacements, that is, a displacement of each frame is marked with reference to a location of a feature point of a first frame of a second facial image. Specifically, the displacement of a second feature point of one frame of a second facial image may be a displacement of a feature point of the one frame of second facial image relative to the feature point of the first frame of second facial image. Through the marking manner, consistency of reference objects may be ensured, and errors may be reduced.

In step 208, the terminal may apply the target displacements of the plurality of vertexes to the three-dimensional image.

In the foregoing step 207 and step 208, the three-dimensional image of the first facial image is changed according to the plurality of second feature points, to simulate the expression change of the second face. These procedures synchronize the three-dimensional image of the first facial image according to changes of the plurality of second feature points of the plurality of frames of second facial images, to simulate the expression change of the second face.

The foregoing conversion procedure is described by using an example in the following. For example, a feature point 83 is used as an origin of coordinates, a direction from the feature point 83 to a forehead is used as a positive direction of an x-axis, and a right direction perpendicular to the x-axis is used as a positive direction of a y-axis. Then, a distance between two first feature points 83 and 85 in the three-dimensional image is defined as a first unit distance L1. The two first feature points 83 and 85 correspond to two second feature points 83' and 85' in the second facial image. A distance between the two second feature points 83' and 85' in a first frame of second facial image is obtained as a second unit distance L2. A ratio L2/L1 is obtained. When a displacement of any feature point in two frames of second facial images is M, a target displacement of a corresponding vertex in the three-dimensional image may be obtained through M/(L2/L1), and a target displacement of another vertex may be deduced by analogy. When the displacements of the plurality of vertexes are applied to the three-dimensional image, shapes, locations, and the like of organs in the three-dimensional image change, and an objective of synchronizing the expression change of the second face may be achieved.

Further, the face used as the synchronization target may not face a front direction. Therefore, because of the orientations of organs on the left and right sides of the face, the detected displacements of the feature points may be asymmetrical. In this case, the displacements may be corrected based on facial orientation data. That is, this embodiment may further perform correcting the displacements, which are obtained in real time, of the plurality of second feature points according to facial orientation data obtained through the facial detection. For example, when the face of the synchronization target slightly faces the left, in the captured second facial image, a size of a left eye may be smaller than a size of a right eye based on a perspective principle. If the synchronization target keeps the posture unchanged, when an expression changes, even if the left eye and the right eye perform actions of the same range, a range of motion of the left eye and a range of motion of the right eye that can be determined by extracted feature points may be different. Therefore, the displacements, which are obtained in real time, of the plurality of second feature points need to be corrected based on angle data in the facial orientation data and according to the facial orientation data obtained through the facial detection. For example, the displacements of the second feature points in the obtained two frames of second facial images are divided by a cosine value of the facial orientation angle, to obtain actual displacements of the second feature points. However, the correction procedure may be alternatively performed by using another manner, and is not limited in this embodiment.

Further, the method may further include recording a change procedure of the three-dimensional image in a case of receiving a recording instruction. If the user wants to make a special effect video or a meme, the user may perform expression synchronization through the foregoing manner, and record the change procedure of the three-dimensional image to obtain a video file or a dynamic image. As describe above, the manner of synchronization is simple and easy for the user, and more accurate representation of a dynamical facial expression may be achieved.

Through the method provided in this embodiment, a three-dimensional image may be obtained by using feature points of a two-dimensional facial image, so that displacements of feature points of another face are synchronized by using feature points of the three-dimensional image, to achieve an objective of synchronizing an expression of another face to a current facial image. A method of performing a real-time and dynamic change on a static image is provided, so that a face in the image can have a corresponding expression change with an expression change of a captured target, to reflect dynamic expressions such as crying, smiling, laughing and making faces, which reduces a technical threshold of expression synchronization.

Figure 5:
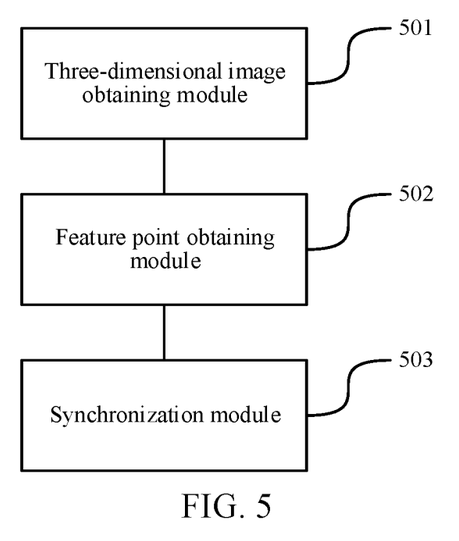
FIG. 5 is a schematic structural diagram of an image processing apparatus according to an embodiment.

FIG. 5 is a schematic structural diagram of an image processing apparatus according to an embodiment. Referring to FIG. 5, the image processing apparatus may include a three-dimensional image obtaining module 501 configured to obtain a three-dimensional image of a first facial image according to a plurality of first feature points of the first facial image, the plurality of first feature points being used for identifying a first face in the first facial image, a feature point obtaining module 502 configured to obtain a plurality of second feature points of a plurality of frames of second facial images in real time, the plurality of second feature points being used for identifying an expression change of a second face, and a synchronization module 503 configured to synchronize the three-dimensional image of the first facial image according to changes of the plurality of second feature points of the plurality of frames of second facial images, to simulate the expression change of the second face.

According to an embodiment, the three-dimensional image obtaining module 501 is further configured to perform facial detection on the first facial image, to obtain the plurality of first feature points of the first facial image, obtain a facial three-dimensional model of the first face according to the plurality of first feature points of the first facial image, and map the first facial image to the facial three-dimensional model as a texture according to texture coordinates of the first facial image, to obtain the three-dimensional image of the first facial image.

The three-dimensional image obtaining module 501 may be further configured to obtain texture coordinates of four image vertexes of the first facial image and the plurality of first feature points and map the facial image to the facial three-dimensional model as a texture according to the texture coordinates, to obtain the three-dimensional image of the first facial image.

The synchronization module 503 may include a conversion unit configured to convert displacements, which are obtained in real time, of a plurality of second feature points in two frames of second facial images into target displacements of a plurality of vertexes in the three-dimensional image, the plurality of vertexes in the three-dimensional image being in a one-to-one correspondence with the plurality of first feature points of the first facial image and an application unit configured to apply the target displacements of the plurality of vertexes to the three-dimensional image.

The conversion unit is configured to use a distance between two target first feature points in the plurality of first feature points as a first unit distance; use a distance between two second feature points, which correspond to the two target first feature points, in one frame of second facial image as a second unit distance; obtain a ratio of the second unit distance to the first unit distance; and divide a displacement of each second feature point in the plurality of second feature points in the two frames of second facial images by the ratio to obtain a target displacement of each vertex in the three-dimensional image.

Here, displacements of the second feature points of the one frame of second facial image may be displacements of feature points of the one frame of second facial image relative to the feature points of the first frame of one frame of second facial image.

The image processing apparatus may further include a correction module configured to correct the displacements, which are obtained in real time, of the plurality of second feature points according to facial orientation data obtained through the facial detection.

In addition, the image processing apparatus may further include a recording module configured to record a change procedure of the three-dimensional image in a case that a recording instruction is received.

The foregoing division of the functional modules is merely used as an example for description when the image processing apparatus provided in the foregoing embodiments performs image processing. In practical application, the foregoing functions may be allocated to and completed by different functional modules according to requirements, that is, an inner structure of an electronic device may be divided into different functional modules to implement all, some, or a part of the functions described above. In addition, the image processing apparatus provided in the foregoing embodiment may be configured with a processor, a memory, and other components to execute the image processing method described above.

Figure 6:
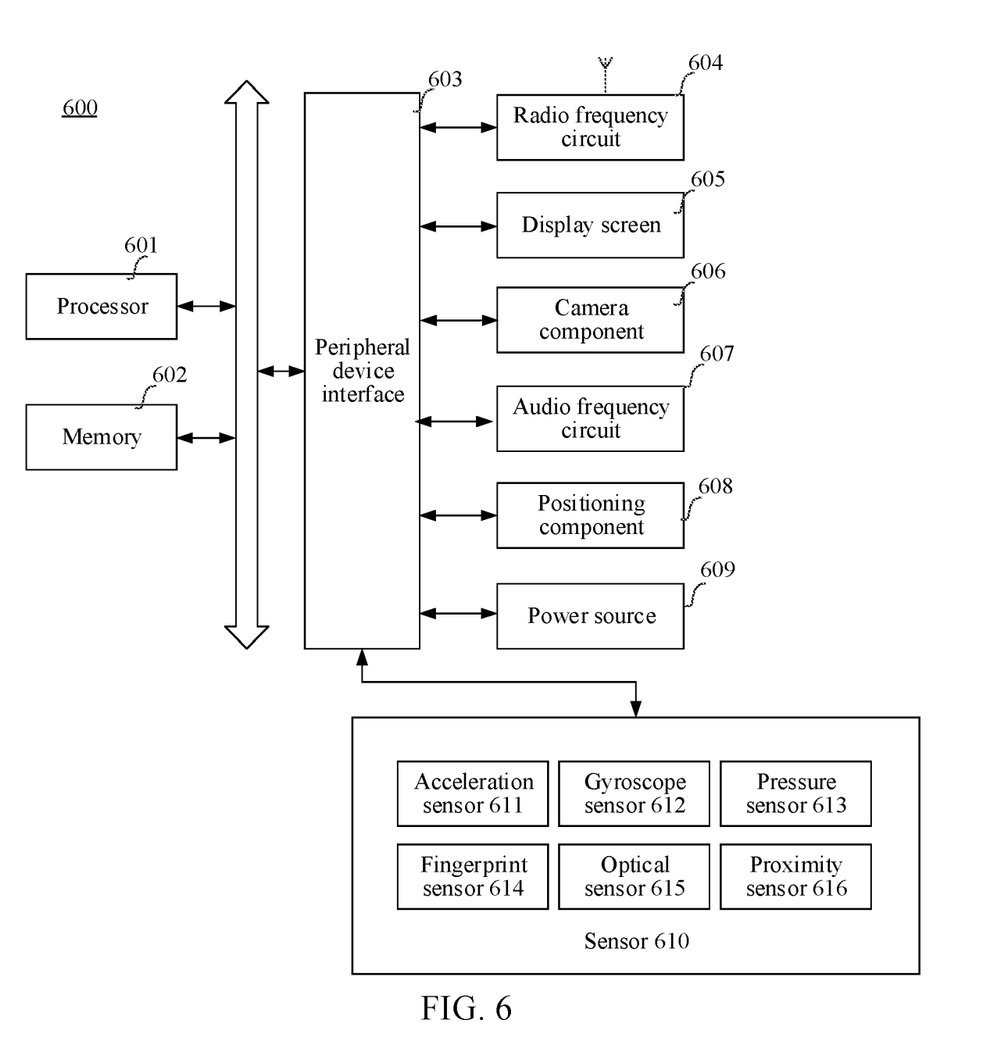
FIG. 6 is a structural block diagram of a terminal according to an embodiment.

FIG. 6 illustrates a structural block diagram of a terminal 600 according to an embodiment. The terminal 600 may be a smartphone, a tablet computer, a moving picture experts group audio layer III (MP3) player, a moving picture experts group audio layer IV (MP4) player, a notebook computer, a desktop computer, etc. The terminal 600 may also be referred to as user equipment, a portable terminal, a laptop terminal, or a desktop terminal.

The terminal 600 may include a processor 601 and a memory 602.

The processor 601 may include one or more processing cores, for example, a quad-core processor or a multi-core processor. The processor 601 may be implemented by at least one hardware form of a digital signal processor (DSP), a field-programmable gate array (FPGA), and a programmable logic array (PLA). The processor 601 may alternatively include a main processor and a coprocessor. The main processor may be configured to process data in an awake state, also referred to as a central processing unit (CPU), and the coprocessor may be a low-power processor configured to process data in an idle state. In some embodiments, the processor 601 may be integrated with a graphics processing unit (GPU). The GPU may be responsible for rendering and drawing content to be displayed by a display screen. In some embodiments, the processor 601 may further include an artificial intelligence (AI) processor. The AI processor may be configured to process a calculation operation related to machine learning.

The memory 602 may include one or more computer-readable storage media. The computer-readable storage media may be non-transient. The memory 602 may further include a high-speed random access memory, and a non-volatile memory such as one or more magnetic disk storage devices and a flash storage device. In some embodiments, the non-transitory computer-readable storage medium in the memory 602 may be configured to store at least one instruction, and the at least one instruction is configured to be executed by the processor 601 to implement operations of the image processing method The image processing method may include obtaining a three-dimensional image of a first facial image according to a plurality of first feature points of the first facial image, the plurality of first feature points being used for identifying a first face in the first facial image; obtaining a plurality of second feature points of a plurality of frames of second facial images in real time, the plurality of second feature points being used for identifying an expression change of a second face; and synchronizing the three-dimensional image of the first facial image according to changes of the plurality of second feature points of the plurality of frames of second facial images, to simulate the expression change of the second face.

In addition, the at least one instruction may be loaded and executed by the processor 601 to implement the following operations, such as performing facial detection on the first facial image, to obtain the plurality of first feature points of the first facial image; obtaining a facial three-dimensional model of the first face according to the plurality of first feature points of the first facial image; and mapping the first facial image to the facial three-dimensional model as a texture according to texture coordinates of the first facial image, to obtain the three-dimensional image of the first facial image.

Furthermore, the at least one instruction may be loaded and executed by the processor 601 to implement the following operations, such as converting displacements of a plurality of second feature points, which are obtained in real-time, in two frames of second facial images into target displacements of a plurality of vertexes in the three-dimensional image, the plurality of vertexes in the three-dimensional image being in a one-to-one correspondence with the plurality of first feature points of the first facial image; and applying the target displacements of the plurality of vertexes to the three-dimensional image.

Furthermore, the at least one instruction may be loaded and executed by the processor 601 to implement the following operations, such as using a distance between two target first feature points in the plurality of first feature points as a first unit distance; using a distance between two second feature points, which correspond to the two target first feature points, in one frame of second facial image as a second unit distance; obtaining a ratio of the second unit distance to the first unit distance; and dividing a displacement of each second feature point in the plurality of second feature points in the two frames of second facial images by the ratio, to obtain a target displacement of each vertex in the three-dimensional image.

Here, displacements of the second feature points of the one frame of second facial image may be displacements of feature points of the one frame of second facial image relative to the feature points of the first frame of one frame of second facial image.

Also, displacements of the second feature points of the one frame of second facial image may be displacements of feature points of the one frame of second facial image relative to the feature points of the first frame of one frame of second facial image.

The at least one instruction may be loaded and executed by the processor 601 to correct the displacements, which are obtained in real time, of the plurality of second feature points according to facial orientation data obtained through the facial detection.

The at least one instruction may be loaded and executed by the processor 601 to record a change procedure of the three-dimensional image in a case of receiving a recording instruction.

In some embodiments, the terminal 600 may further include a peripheral device interface 603 and at least one peripheral device. The processor 601, the memory 602, and the peripheral device interface 603 may be connected through a bus or a signal cable. Each peripheral device may be connected to the peripheral device interface 603 through a bus, a signal cable, or a circuit board. Specifically, the peripheral device may include at least one of a radio frequency (RF) circuit 604, a display screen 605, a camera component 606, an audio frequency circuit 607, a positioning component 608, and a power source 609.

The peripheral device interface 603 may be configured to connect the at least one peripheral device related to input/output (I/O) to the processor 601 and the memory 602. In some embodiments, the processor 601, the memory 602, and the peripheral device interface 603 are integrated into the same chip or circuit board. In some other embodiments, any one or two of the processor 601, the memory 602, and the peripheral device interface 603 may be implemented on an independent chip or circuit board. However, the embodiment described above is not limited thereto.

The RF circuit 604 may be configured to receive and transmit a RF signal, also referred to as an electromagnetic signal. The RF circuit 604 communicates with a communications network and another communications device by using the electromagnetic signal. The RF circuit 604 converts an electric signal into an electromagnetic signal for transmission, or converts a received electromagnetic signal into an electric signal. In addition, the RF circuit 604 may include an antenna system, an RF transceiver, one or more amplifiers, a tuner, an oscillator, a digital signal processor, a codec chip set, a subscriber identity module card, and the like. The RF circuit 604 may communicate with another terminal by using at least one wireless communication protocol. The wireless communication protocol may include, but is not limited to a metropolitan area network, generations of mobile communication networks (2G, 3G, 4G, and 5G), a wireless local area network and/or a wireless fidelity (Wi-Fi) network. In some embodiments, the RF circuit 604 may further include a near field communication (NFC) related circuit. However, the RF circuit 604 is not limited to the embodiment described above.

The display screen 605 may be configured to display a user interface (UI). The UI may include a graph, text, an icon, a video, and any combination thereof. When the display screen 605 is a touch screen, the display screen 605 is further capable of collecting a touch signal on or over a surface of the display screen 605. The touch signal may be used as a control signal to be inputted into the processor 601 for processing. In this case, the display screen 605 may be further configured to provide a virtual button and/or a virtual keyboard, also referred to as a soft button and/or a soft keyboard. In some embodiments, there is one display screen 605, disposed on a front panel of the terminal 600. In some other embodiments, there may be two display screens 605, respectively disposed on different surfaces of the terminal 600 or designed in a foldable shape. In still some other embodiments, the display screen 605 may be a flexible display screen, disposed on a curved surface or a folded surface of the terminal 600. Even, the display screen 605 may be further set to have a non-rectangular irregular graph, that is, a special-shaped screen. The display screen 605 may be manufactured by using a material such as a liquid crystal display (LCD), an organic light-emitting diode (OLED), or the like.

The camera component 606 may be configured to acquire an image or a video. The camera component 606 may include a front-facing camera and a rear-facing camera. Generally, the front-facing camera is disposed on the front panel of the terminal, and the rear-facing camera is disposed on a back face of the terminal. In some embodiments, there may be at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 606 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 607 may include a microphone and a loudspeaker. The loudspeaker may be configured to collect sound waves of a user and an environment, and convert the sound waves into electric signals and input the electrical signals into the processor 601 for processing, or input the electrical signals into the RF circuit 604 to implement speech communication. For the purpose of stereo sound collection or noise reduction, there may be a plurality of microphones, respectively disposed at different parts of the terminal 600. The microphone may be further a microphone array or an omnidirectional collection microphone. The loudspeaker is configured to convert electric signals from the processor 601 or the RF circuit 604 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 607 may further include an earphone jack.

The positioning component 608 may be configured to position a current geographic location of the terminal 600, to implement a navigation or a location based service (LBS). The positioning component 608 may be a positioning component based on the global positioning system (GPS) of the United States, the Beidou system of China, the Glonass system of Russia, or the Galileo system of the European Union.

The power supply 609 may be configured to supply power to components in the terminal 600. The power supply 609 may be an alternating current, a direct current, a primary battery, or a rechargeable battery. When the power supply 609 includes the rechargeable battery, the rechargeable battery may support wired charging or wireless charging. The rechargeable battery may be further configured to support a quick charge technology.

In some embodiments, the terminal 600 may further include one or more sensors 610. The one or more sensors 610 may include, but are not limited to, an acceleration sensor 611, a gyroscope sensor 612, a pressure sensor 613, a fingerprint sensor 614, an optical sensor 615, and a proximity sensor 616.

The acceleration sensor 611 may detect acceleration on three coordinate axes of a coordinate system established by the terminal 600. For example, the acceleration sensor 611 may be configured to detect components of gravity acceleration on the three coordinate axes. The processor 601 may control, according to a gravity acceleration signal collected by the acceleration sensor 611, the display screen 605 to display the user interface in a frame view or a portrait view. The acceleration sensor 611 may be further configured to collect motion data of a game or a user.

The gyroscope sensor 612 may detect a body direction and a rotation angle of the terminal 600. The gyroscope sensor 612 may cooperate with the acceleration sensor 611 to collect a 3D action by the user on the terminal 600. The processor 601 may implement the following functions according to the data collected by the gyroscope sensor 612, such as motion sensing (for example, changing the UI according to a tilt operation of the user), image stabilization during shooting, game control, and inertial navigation.

The pressure sensor 613 may be disposed on a side frame of the terminal 600 and/or a lower layer of the display screen 605. When the pressure sensor 613 is disposed on the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the low layer of the display screen 605, the processor 601 controls, according to a pressure operation of the user on the display screen 605, an operable control on the UI. The operable control includes at least one of a button control, a scroll bar control, an icon control, and a menu control.

The fingerprint sensor 614 may be configured to collect a fingerprint of the user. The processor 601 identifies an identity of the user according to the fingerprint collected by the fingerprint sensor 614, or the fingerprint sensor 614 identifies an identity of the user according to the collected fingerprint. When the identity of the user is identified as a trusted identity, the processor 601 authorizes the user to perform a related sensitive operation. The sensitive operation includes unlocking a screen, viewing encrypted information, downloading software, payment, changing settings, and the like. The fingerprint sensor 614 may be disposed on a front face, a back face, or a side face of the terminal 600. When a physical button or a vendor logo is disposed on the terminal 600, the fingerprint 614 may be integrated with the physical button or the vendor logo.

The optical sensor 615 may be configured to collect ambient light intensity. In an embodiment, the processor 601 may control display luminance of the display screen 605 according to the ambient light intensity collected by the optical sensor 615. Specifically, when the ambient light intensity is relatively high, the display luminance of the display screen 605 is increased. When the ambient light intensity is relatively low, the display luminance of the display screen 605 is reduced. In an embodiment, the processor 601 may further control the optical sensor 615 and the camera component 606 to dynamically adjust shooting parameters of the camera component 606 according to the ambient light intensity collected by the optical sensor 615.

The proximity sensor 616, also referred to as a distance sensor, may be disposed on the front panel of the terminal 600. The proximity sensor 616 may be configured to collect a distance between a front face of the user and the front face of the terminal 600. For example, when the proximity sensor 616 detects that the distance between the user and the front surface of the terminal 600 gradually decreases, the display screen 605 may be controlled by the processor 601 to switch from a screen-on state to a screen-off state. As another example, in a case that the proximity sensor 616 detects that the distance between the user and the front surface of the terminal 600 gradually increases, the display screen 605 is controlled by the processor 601 to switch from the screen-off state to the screen-on state.

A person skilled in the art may understand that the structure shown in FIG. 6 does not constitute a limitation to the terminal 600, and the terminal may include more components or fewer components than those shown in the figure, or some components may be combined, or a different component may be implemented.

According to an embodiment, a computer-readable storage medium, for example, a memory including instructions, may be further provided. The instructions may be executed by the processor in the terminal to implement the operations of the image processing method.

The image processing method may include obtaining a three-dimensional image of a first facial image according to a plurality of first feature points of the first facial image, the plurality of first feature points being used for identifying a first face in the first facial image; obtaining a plurality of second feature points of a plurality of frames of second facial images in real time, the plurality of second feature points being used for identifying an expression change of a second face; and synchronizing the three-dimensional image of the first facial image according to changes of the plurality of second feature points of the plurality of frames of second facial images, to simulate the expression change of the second face.

The at least one instruction may be loaded and executed by the processor to implement the following operations, such as performing facial detection on the first facial image, to obtain the plurality of first feature points of the first facial image; obtaining a facial three-dimensional model of the first face according to the plurality of first feature points of the first facial image; and mapping the first facial image to the facial three-dimensional model as a texture according to texture coordinates of the first facial image, to obtain the three-dimensional image of the first facial image.

In addition, the at least one instruction may be loaded and executed by the processor to implement the following operations, such as converting displacements, which are obtained in real time, of a plurality of second feature points in two frames of second facial images into target displacements of a plurality of vertexes in the three-dimensional image, the plurality of vertexes in the three-dimensional image being in a one-to-one correspondence with the plurality of first feature points of the first facial image; and applying the target displacements of the plurality of vertexes to the three-dimensional image.

Furthermore, the at least one instruction may be loaded and executed by the processor to implement the following operations, such as using a distance between two target first feature points in the plurality of first feature points as a first unit distance; using a distance between two second feature points, which correspond to the two target first feature points, in one frame of second facial image as a second unit distance; obtaining a ratio of the second unit distance to the first unit distance; and dividing a displacement of each second feature point in the plurality of second feature points in the two frames of second facial images by the ratio, to obtain a target displacement of each vertex in the three-dimensional image.

Here, displacements of the second feature points of the one frame of second facial image may be displacements of feature points of the one frame of second facial image relative to the feature points of the first frame of one frame of second facial image.

The at least one instruction may be loaded and executed by the processor to correct the displacements of the plurality of second feature points, which are obtained in real time, according to facial orientation data obtained through the facial detection.

In addition, the at least one instruction may be loaded and executed by the processor to record a change procedure of the three-dimensional image in a case of receiving a recording instruction.

For example, the computer readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by using hardware, or may be implemented by a program instructing certain hardware. The program may be stored in a computer readable storage medium. The storage medium may be a ROM, a magnetic disk, an optical disc, or the like.

The foregoing descriptions are merely example embodiments of the disclosure, and are not intended to limit the scope of the disclosure. Any modification, equivalent replacement, improvement and the like made within the spirit and principle of the disclosure shall fall within the protection scope of this disclosure.

What is claimed is:

1. An image processing method, performed by an electronic device, the method comprising:
   obtaining a three-dimensional image of a first facial image based on a plurality of first feature points of the first facial image, the plurality of first feature points being used to identify a first face in the first facial image;
   obtaining a plurality of second feature points in each of a plurality of frames of second facial images in real time, the plurality of second feature points being used to identify an expression change of a second face; and
   synchronizing the three-dimensional image of the first facial image based on changes of the plurality of second feature points in each of the plurality of frames of second facial images, to simulate the expression change of the second face,
   wherein the obtaining the three-dimensional image of the first facial image comprises:
      obtaining a universal facial three-dimensional model; and
      adjusting the universal facial three-dimensional model based on the plurality of first feature points,
   wherein the adjusting the universal facial three-dimensional model comprises an overall adjustment and a local adjustment, the overall adjustment is configured to perform scaling processing on the universal facial three-dimensional model with respect to a size and a direction of a projection of the universal facial three-dimensional model, and the local adjustment is configured to adjust vertexes in the universal facial three-dimensional model,
   wherein the overall adjustment is performed until the size and the direction of the projection of the universal facial three-dimensional model matches the first face, and
   wherein the local adjustment is performed based on the size and the direction of the first face matching the size and the direction of the projection of the universal facial three-dimensional model as a result of the overall adjustment.

2. The method according to claim 1, wherein the obtaining the three-dimensional image of the first facial image further comprises:
   performing facial detection on the first facial image to obtain the plurality of first feature points of the first facial image; and
   mapping the first facial image to the universal facial three-dimensional model according to texture coordinates of the first facial image to obtain the three-dimensional image of the first facial image.

3. The method according to claim 1, wherein the synchronizing the three-dimensional image of the first facial image further comprises:
   converting displacements in each of a plurality of second feature points of second facial images into target displacements of a plurality of vertexes in the three-dimensional image in real time, the plurality of vertexes in the three-dimensional image being a one-to-one correspondence with the plurality of first feature points of the first facial image; and
   applying the target displacements of the plurality of vertexes to the three-dimensional image.

4. The method according to claim 3, wherein the converting the displacements in each of the plurality of second feature points of second facial images into the target displacements of the plurality of vertexes in the three-dimensional image further comprises:
   determining a first unit distance between at least two target first feature points among the plurality of first feature points;
   determining a second unit distance between at least two second feature points corresponding to the at least two target first feature points, in one of the plurality of frames of second facial images;
   calculating a ratio of the second unit distance to the first unit distance; and
   multiplying a displacement of each second feature point included in each of at least two frames of the second facial images by the ratio, to obtain a target displacement of each vertex in the three-dimensional image.

5. The method according to claim 4, wherein the displacements of the second feature points of one frame among a plurality of frames of the second facial images are displacements relative to the second feature points of a first frame among the plurality of frames of the second facial images, and
   wherein the one frame and the first frame are different frames among the plurality of frames of the second facial images.

6. The method according to claim 3, wherein the displacements of the second feature points of one frame among a plurality of frames of the second facial images are displacements relative to the second feature points of a first frame among the plurality of frames of the second facial images, and
   wherein the one frame and the first frame are different frames among the plurality of frames of the second facial images.

7. The method according to claim 3, further comprising:
   correcting the displacements of the plurality of second feature points according to facial orientation data obtained through facial detection.

8. The method according to claim 1, further comprising:
   recording a change procedure of the three-dimensional image based on receiving a recording instruction.

9. An electronic device comprising:
   at least one memory configured to store computer program code; and
   at least one processor configured to access the computer program code and operate as instructed by the computer program code, the computer program code comprising:

three-dimensional image obtaining code configured to cause the at least one processor to obtain a three-dimensional image of a first facial image based on a plurality of first feature points of the first facial image, the plurality of first feature points being used to identify a first face in the first facial image;

feature point obtaining code configured to cause the at least one processor to obtain a plurality of second feature points in each of a plurality of frames of second facial images in real time, the plurality of second feature points being used to identify an expression change of a second face; and synchronization code configured to cause the at least one processor to synchronize the three-dimensional image of the first facial image based on changes of the plurality of second feature points in each of the plurality of frames of second facial images, to simulate the expression change of the second face, wherein the three-dimensional image obtaining code is further configured to cause the at least one processor to:
obtain a universal facial three-dimensional model; and
adjust the universal facial three-dimensional model based on the plurality of first feature points, and adjust the universal facial three-dimensional model according to an overall adjustment and a local adjustment, the overall adjustment is configured to perform scaling processing on the universal facial three-dimensional model with respect to a size and a direction of a projection of the universal facial three-dimensional model, and the local adjustment is configured to adjust vertexes in the universal facial three-dimensional model, wherein the overall adjustment is performed until the size and the direction of the projection of the universal facial three-dimensional model matches the first face, and wherein the local adjustment is performed based on the size and the direction of the first face matching the size and the direction of the projection of the universal facial three-dimensional model as a result of the overall adjustment.

10. The electronic device according to claim 9, wherein the three-dimensional image obtaining code is further configured to cause the at least one processor to:
perform facial detection on the first facial image, to obtain the plurality of first feature points of the first facial image; and
map the first facial image to the universal facial three-dimensional model according to texture coordinates of the first facial image, to obtain the three-dimensional image of the first facial image.

11. The electronic device according to claim 9, wherein the synchronization code is further configured to cause the at least one processor to:
convert displacements in each of a plurality of second feature points of second facial images into target displacements of a plurality of vertexes in the three-dimensional image in real time, the plurality of vertexes in the three-dimensional image being a one-to-one correspondence with the plurality of first feature points of the first facial image; and
apply the target displacements of the plurality of vertexes to the three-dimensional image.

12. The electronic device according to claim 11, wherein the synchronization code is further configured to cause the at least one processor to:

determine a first unit distance between at least two target first feature points among the plurality of first feature points;
determine a second unit distance between at least two second feature points corresponding to the at least two target first feature points, in one of the plurality of frames of second facial images;
calculate a ratio of the second unit distance to the first unit distance; and
multiply a displacement of each second feature point included in each of at least two frames of the second facial images by the ratio, to obtain a target displacement of each vertex in the three-dimensional image.

13. The electronic device according to claim 12, wherein the displacements of the second feature points of one frame among a plurality of frames of the second facial images are displacements relative to the second feature points of a first frame among the plurality of frames of the second facial images, and
wherein the one frame and the first frame are different frames among the plurality of frames of the second facial images.

14. The electronic device according to claim 11, wherein the displacements of the second feature points of one frame among a plurality of frames of the second facial images are displacements relative to the second feature points of a first frame among the plurality of frames of the second facial images, and
wherein the one frame and the first frame are different frames among the plurality of frames of the second facial images.

15. The electronic device according to claim 11, further comprising:
correction code configured to cause the at least one processor to correct the displacements of the plurality of second feature points according to facial orientation data obtained through facial detection.

16. The electronic device according to claim 9, further comprising:
recording code configured to cause the at least one processor to record a change procedure of the three-dimensional image based on receiving a recording instruction.

17. A non-transitory computer-readable storage medium, storing one or more programs including at least one instruction, when the at least one instruction is loaded and executed by a processor, causes the processor to:
obtain a three-dimensional image of a first facial image based on a plurality of first feature points of the first facial image, the plurality of first feature points being used to identify a first face in the first facial image;
obtain a plurality of second feature points in each of a plurality of frames of second facial images in real time, the plurality of second feature points being used to identify an expression change of a second face; and
synchronize the three-dimensional image of the first facial image based on changes of the plurality of second feature points in each of the plurality of frames of second facial images, to simulate the expression change of the second face,
wherein the at least one instruction further cause the processor to:
obtain a universal facial three-dimensional model; and
adjust the universal facial three-dimensional model based on the plurality of first feature points, and adjust the universal facial three-dimensional model according to an overall adjustment and a local adjustment, the overall adjustment is configured to perform scaling processing on the universal facial three-dimensional model with respect to a size and a direction of a projection of the universal facial three-dimensional model, and the local adjustment is configured to adjust vertexes in the universal facial three-dimensional model, and wherein the overall adjustment is performed until the size and the direction of the projection of the universal facial three-dimensional model matches the first face, and wherein the local adjustment is performed based on the size and the direction of the first face matching the size and the direction of the projection of the universal facial three-dimensional model as a result of the overall adjustment.

18. The non-transitory computer-readable storage medium according to claim 17, wherein the at least one instruction is loaded and executed by the processor to:

perform facial detection on the first facial image, to obtain the plurality of first feature points of the first facial image; and map the first facial image to the universal facial three-dimensional model according to texture coordinates of the first facial image, to obtain the three-dimensional image of the first facial image.

19. The non-transitory computer-readable storage medium according to claim 17, wherein the at least one instruction is loaded and executed by the processor to:

convert displacements in each of a plurality of second feature points of second facial images into target displacements of a plurality of vertexes in the three-dimensional image in real time, the plurality of vertexes in the three-dimensional image being a one-to-one correspondence with the plurality of first feature points of the first facial image; and apply the target displacements of the plurality of vertexes to the three-dimensional image.

20. The non-transitory computer-readable storage medium according to claim 19, wherein the at least one instruction is loaded and executed by the processor to:

determine a first unit distance between at least two target first feature points among the plurality of first feature points;

determine a second unit distance between at least two second feature points corresponding to the at least two target first feature points, in one of the plurality of frames of second facial images;

calculate a ratio of the second unit distance to the first unit distance; and multiply a displacement of each second feature point included in each of at least two frames of the second facial images by the ratio, to obtain a target displacement of each vertex in the three-dimensional image.

* * * * *